US008631149B2

(12) United States Patent
Kamath et al.

(10) Patent No.: US 8,631,149 B2
(45) Date of Patent: Jan. 14, 2014

(54) SYSTEMS AND METHODS FOR OBJECT RATE LIMITING

(75) Inventors: Sandeep Kamath, San Jose, CA (US); Prakash Khemani, Ft. Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 777 days.

(21) Appl. No.: 12/323,310

(22) Filed: Nov. 25, 2008

(65) Prior Publication Data

US 2010/0131668 A1   May 27, 2010

(51) Int. Cl.
*G06F 15/16* (2006.01)
(52) U.S. Cl.
USPC .......................................... 709/233
(58) Field of Classification Search
USPC ......... 709/223, 225, 226, 227, 231–235, 238, 709/245; 370/230, 235, 401, 468, 477; 710/5–7, 15; 718/104, 105
See application file for complete search history.

(56) References Cited

U.S. PATENT DOCUMENTS

| 6,928,051 | B2 * | 8/2005 | Butt et al. ..................... 370/230 |
| 2002/0138643 | A1 | 9/2002 | Shin et al. |
| 2004/0003087 | A1 * | 1/2004 | Chambliss et al. ........... 709/226 |
| 2006/0136590 | A1 * | 6/2006 | Barrett et al. .................. 709/225 |
| 2006/0159098 | A1 * | 7/2006 | Munson et al. ................ 370/394 |

FOREIGN PATENT DOCUMENTS

WO   WO-02/01834 A2   1/2002

OTHER PUBLICATIONS

International Search Report for PCT/US09/065711 mailed on Mar. 24, 2010, 4 pages.
Written Opinion for PCT/US09/065711 mailed on Mar. 24, 2010, 5 pages.
International Preliminary Report on Patentability on PCT/US2009/065711 dated Jun. 9, 2011.
Written Opinion on PCT/US2009/065711 dated Jun. 9, 2011.

\* cited by examiner

*Primary Examiner* — Ruolei Zong
(74) *Attorney, Agent, or Firm* — Foley and Lardner LLP; Christopher J. McKenna

(57) ABSTRACT

The present application is generally directed to systems and method for throttling a rate of requests between a client and a server using user specified inputs. A rate of requests for an object may be throttled by an intermediary which receives requests transmitted between a client and a server and via the intermediary. The intermediary may receive a request from a client for an object of a server. The intermediary may identify a policy specifying a mode of throttling for the request, the policy specifying a mode of throttling, a rate threshold and a period of time for the rate threshold. The rate throttler of the intermediary may determine whether the request exceeds the rate threshold for the period of time based on the mode of throttling of the policy and allow or block the request responsive to the determination.

22 Claims, 11 Drawing Sheets

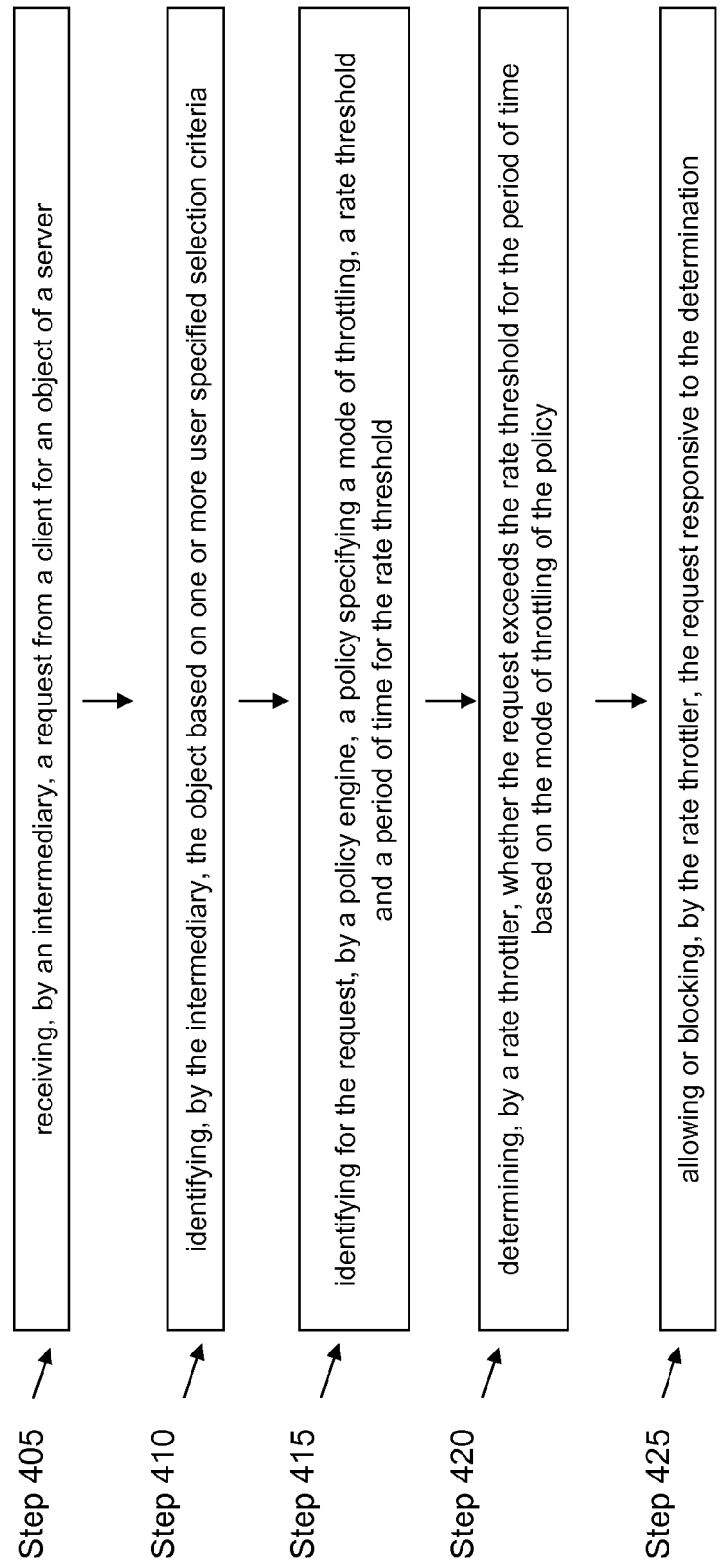

SYSTEMS AND METHODS FOR OBJECT RATE LIMITING

FIELD OF THE INVENTION

The present application generally relates to data communication networks. In particular, the present application relates to systems and methods for providing a rate throttling of a rate of requests of objects transmitted via an intermediary across the network.

BACKGROUND OF THE INVENTION

A typical enterprise provides many users access to servers via a network. With the explosion of content, such as media, the servers may provide access to and deliver a wide range of different objects. Some objects may be large. Other objects may be small. Accordingly, certain objects consume more network resources and bandwidth than other objects. A user may request any type of object from a server. In some cases, a user request a object that should be delivered with a higher priority than another object request. For example, in an enterprise, access to certain objects may be more important to operations than other objects. In some cases, users of the enterprise network may request objects that are not business related. Sometimes the requests for these types of object impact the delivery of business related objects. With a wide range of users, a high volume of user requests and different types of objects, it is challenging to manage users access to these objects.

BRIEF SUMMARY OF THE INVENTION

The present disclosure is related to a framework for an enterprise or a corporation to mitigate or prevent risks that could potentially impact resource availability and reliability by rate limiting access to an entity. A threat indicating an impending danger to servers of the enterprise may eventually lead to a loss of revenue. Appropriate preventive action may need to be taken in order to minimize or prevent threats. In order to prevent its resource from getting overwhelmed an enterprise may need a mechanism by which an administrator may specify a maximum load a resource can take in a given time frame. The rate limiting factor could be number of requests, number of packets or bandwidth. Once an administrator specified threshold is exceeded, a user may specify a desired action.

The present disclosure presents a solution to these and similar problems by presenting systems and method that enable the user on a network to specify the maximum load a resource can take within a specified time period. Such systems and method may help the user prevent overburdening of the resources.

In some aspects, the present invention is related to a method for throttling a rate of requests for an object by an intermediary that receives requests between a client and a server. The intermediary may receive a request from a client for an object of a server. The intermediary may identify a policy specifying a mode of throttling for the request. The policy specifies a mode of throttling, a rate threshold and a period of time for the rate threshold. A rate throttler of the intermediary may determine whether the request exceeds the rate threshold for the period of time based on the mode of throttling of the policy. The rate throttler may allow or block the request responsive to the determination.

In some embodiments, the object may be identified based on one or more user specified selection criteria. In other embodiments, the policy may be identified based on the identified object. In yet other embodiments, the policy may specify the mode of throttling as bursty. In further embodiments, the policy may specify the mode of throttling as smooth. In still further embodiments, the policy may specify the mode of throttling based on a number of connections from the client. In yet further embodiments, the policy may specify the mode of throttling based on bandwidth used by the client via the intermediary.

In some embodiments, the rate throttler may determine that during a current time period specified by the period of time of the policy a number of requests for the object has exceeded the rate threshold. In other embodiments, the rate throttler may block the request upon receipt of the request. In yet other embodiments, the rate throttler may determine that during a current time period specified by the period of time of the policy a number of requests for the object is less than or equal to the rate threshold. In yet further embodiments, the rate throttler allows the request and forwards the request to the server.

In some aspects, the present invention relates to a system for throttling a rate of requests for an object by an intermediary that receives the requests between a client and a server. An intermediary may receive a request from a client for an object of a server. A policy engine may identify a policy for the request. The policy may specify a mode of throttling, a rate threshold and a period of time for the rate threshold. A rate throttler may determine whether the request exceeds the rate threshold for the period of time based on the mode of throttling of the policy. The rate throttler may allow or block the request responsive to the determination.

In some embodiments, the policy engine identifies the object based on one or more user specified selection criteria. In other embodiments, the policy engine identifies the policy based on the identified object. In further embodiments, the policy specifies the mode of throttling as bursty. In yet further embodiments, the policy specifies the mode of throttling as smooth. In yet further embodiments, the policy specifies the mode of throttling based on a number of connections from the client. In some embodiments, the policy specifies the mode of throttling based on bandwidth used by the client via the intermediary. In some embodiments, the rate throttler determines that during a current time period specified by the period of time of the policy a number of requests for the object has exceeded the rate threshold. In further embodiments, the rate throttler blocks the request upon receipt of the request. In yet further embodiments, the rate throttler determines that during a current time period specified by the period of time of the policy a number of requests for the object is less than or equal to the rate threshold. In further embodiments, the rate throttler allows the request and forwards the request to the server.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 4B is a flow diagram of embodiments of a method for throttling a rate of requests of objects between a client and a server.

Figure 1A:
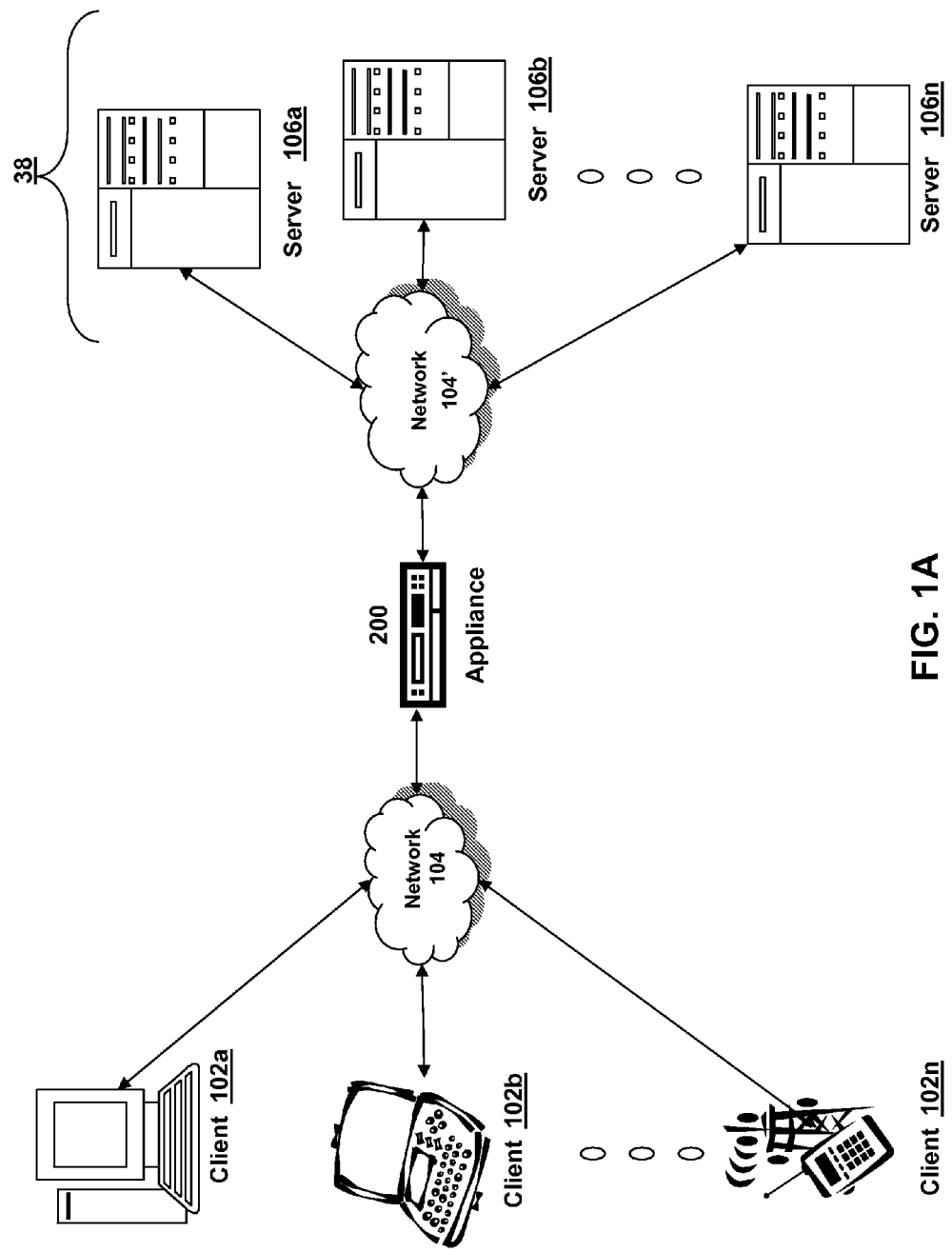
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server; and Section D describes embodiments of systems and methods for rate limiting objects by an intermediary.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
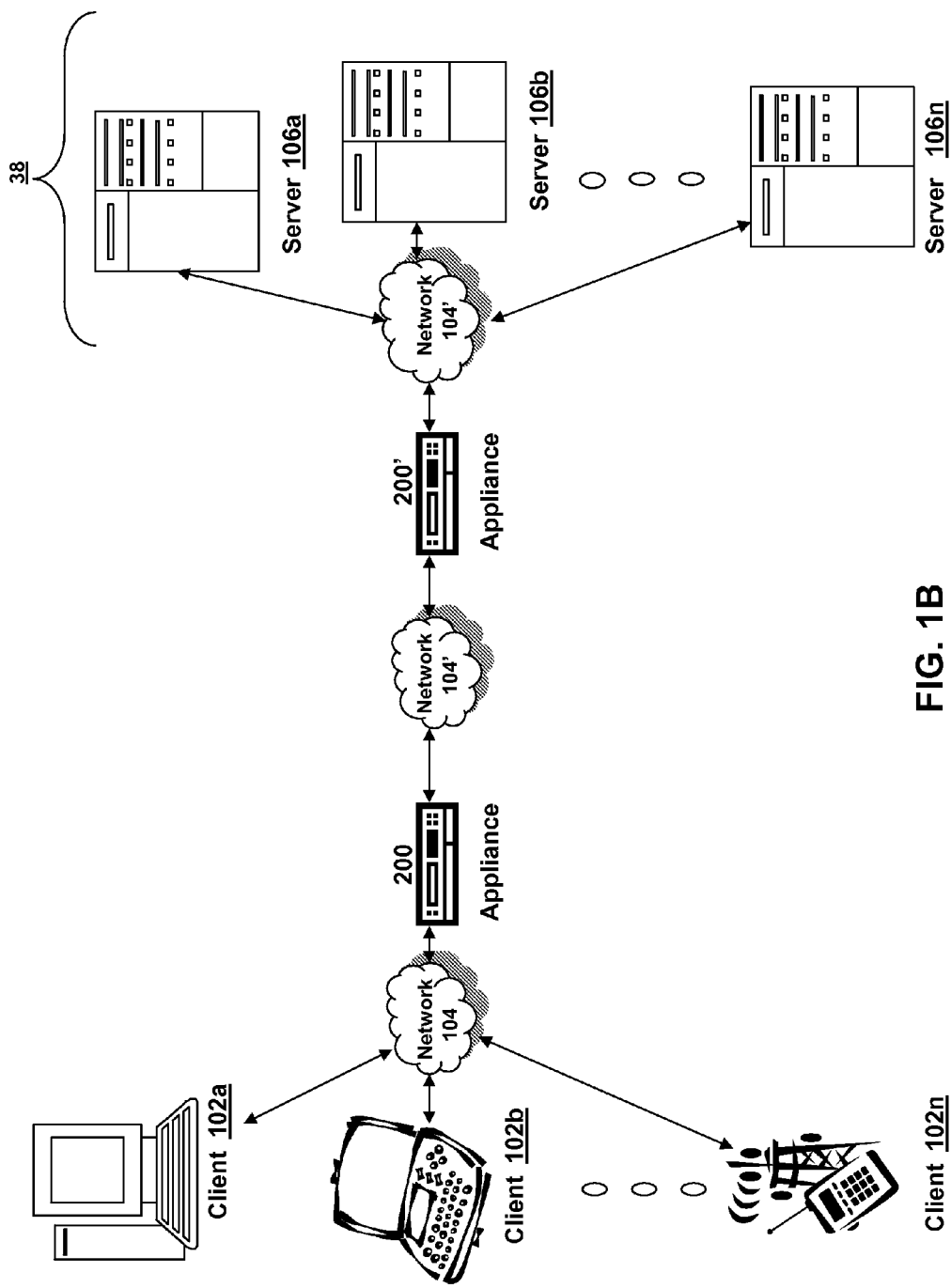
FIG. 1B is a block diagram of an embodiment of an environment for delivering a computing environment from a server to a client via an appliance.
Figure 1C:
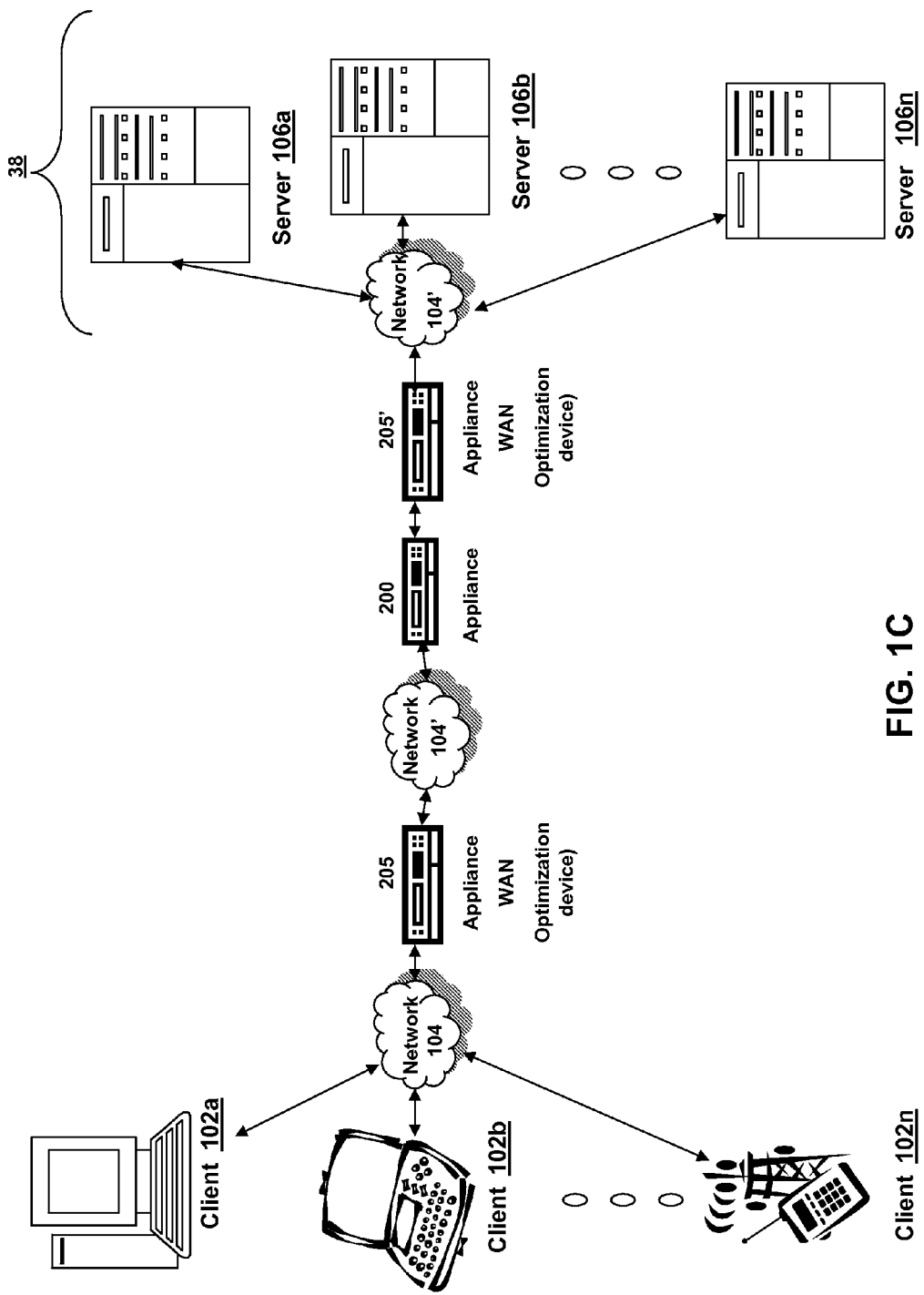
FIG. 1C is a block diagram of another embodiment of an environment for delivering a computing environment from a server to a client via a plurality of appliances.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WAN-Jet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
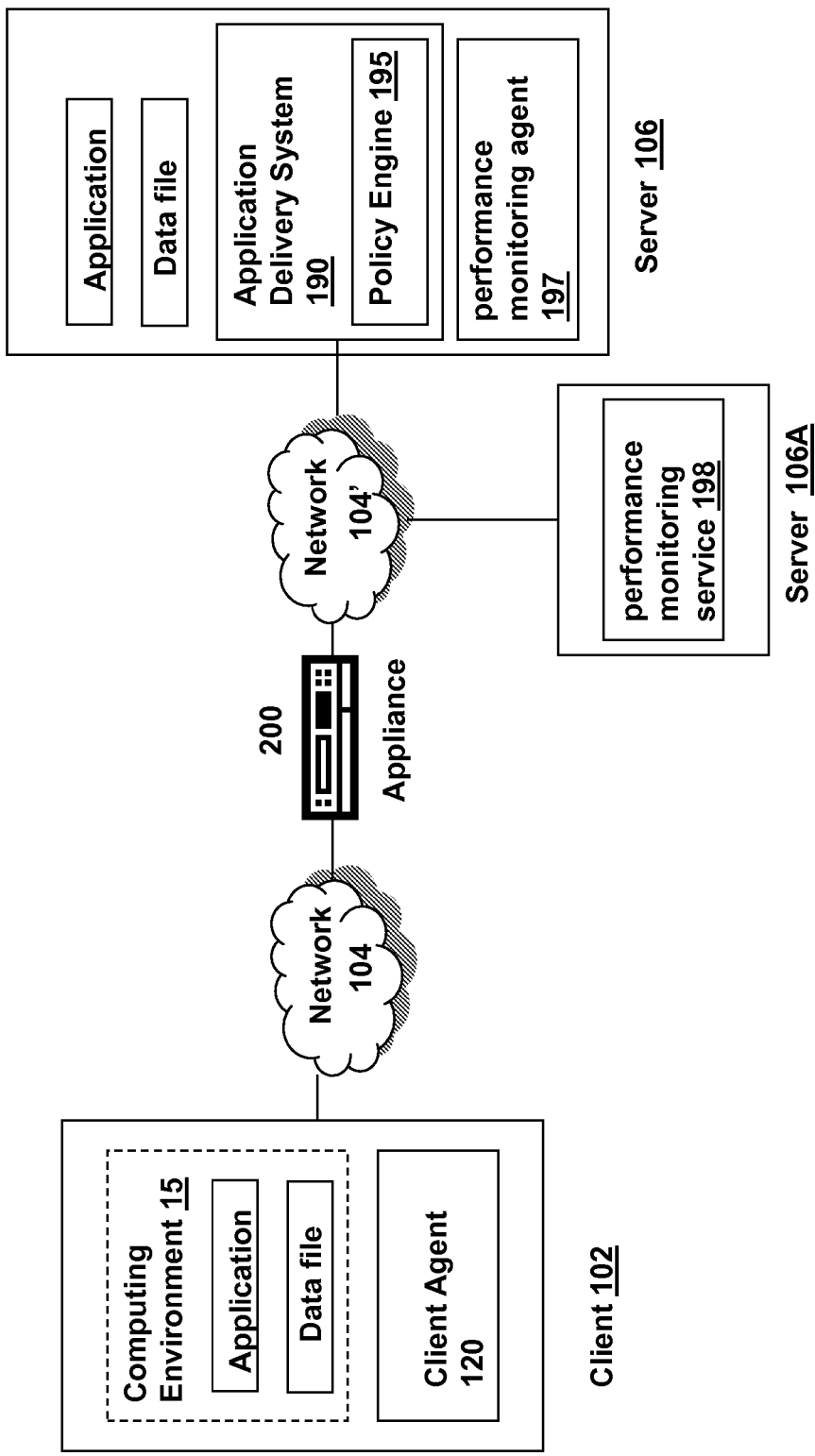
FIG. 1D is a block diagram of another embodiment of an environment for delivering a computing environment from a server to a client via.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
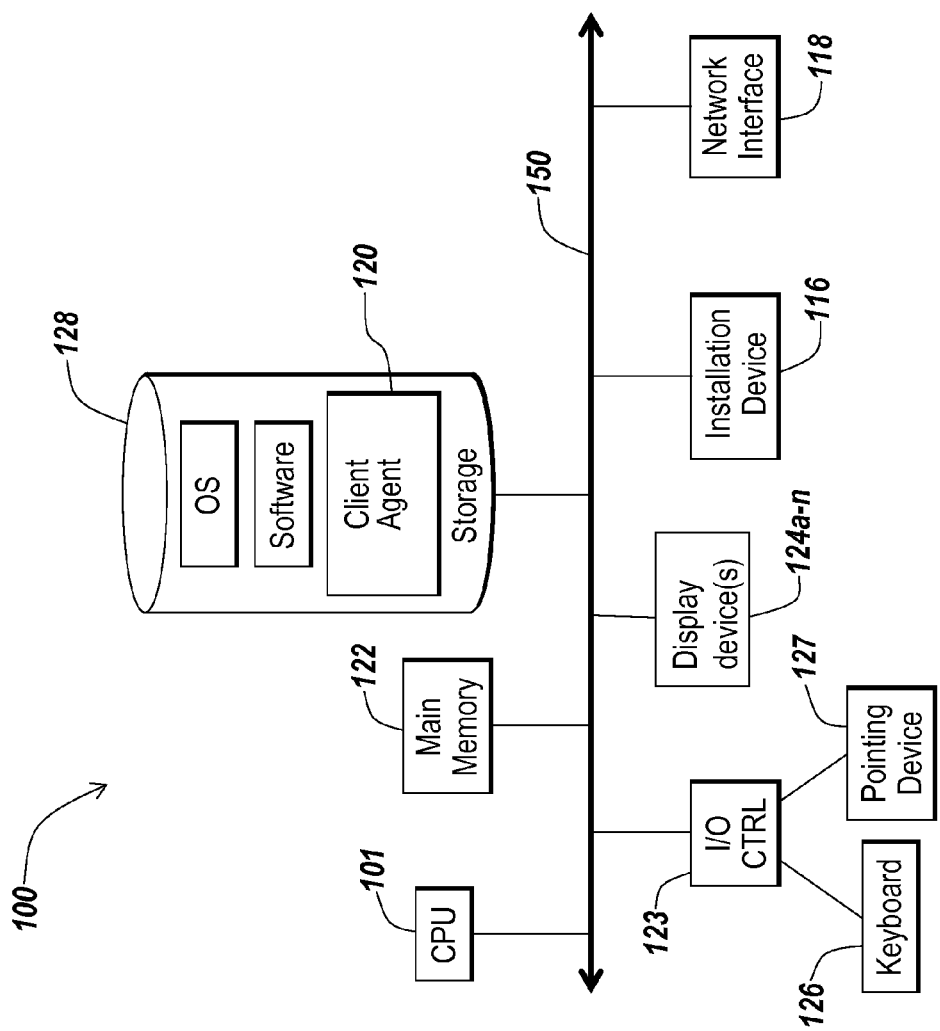
FIGS. 1E and 1F are block diagrams of embodiments of a computing device.
Figure 1F:
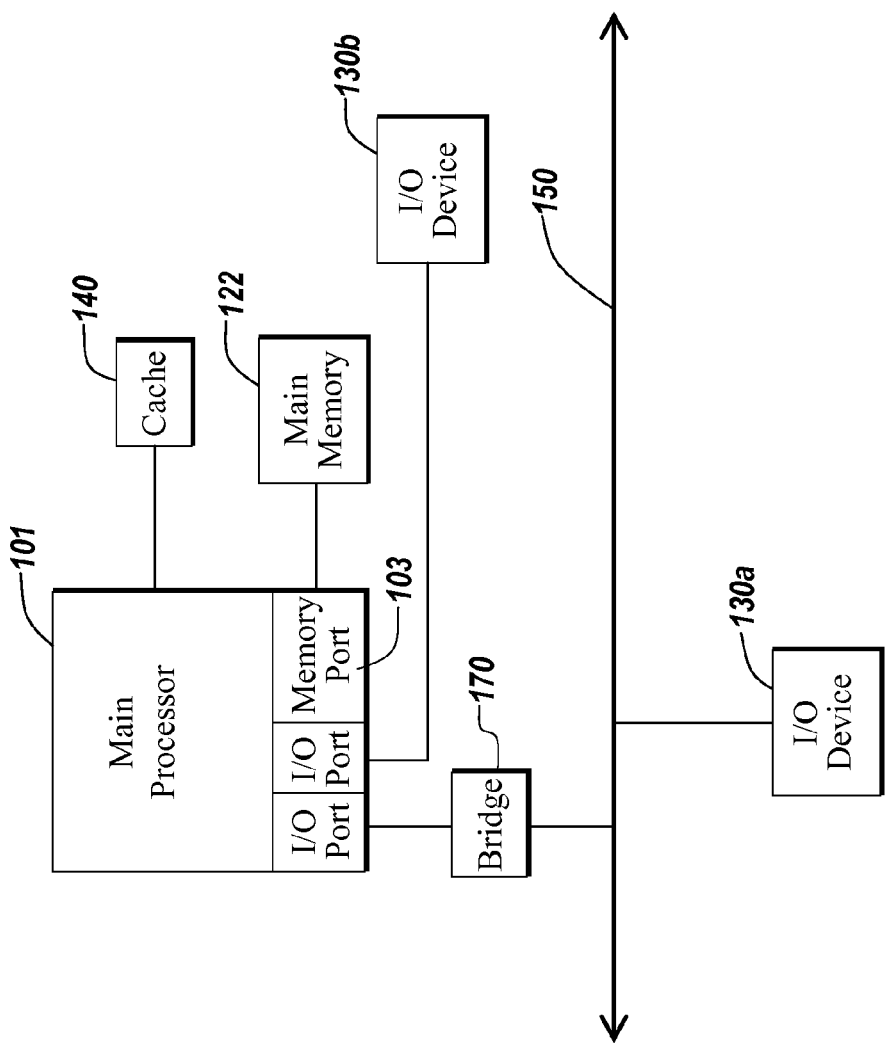

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
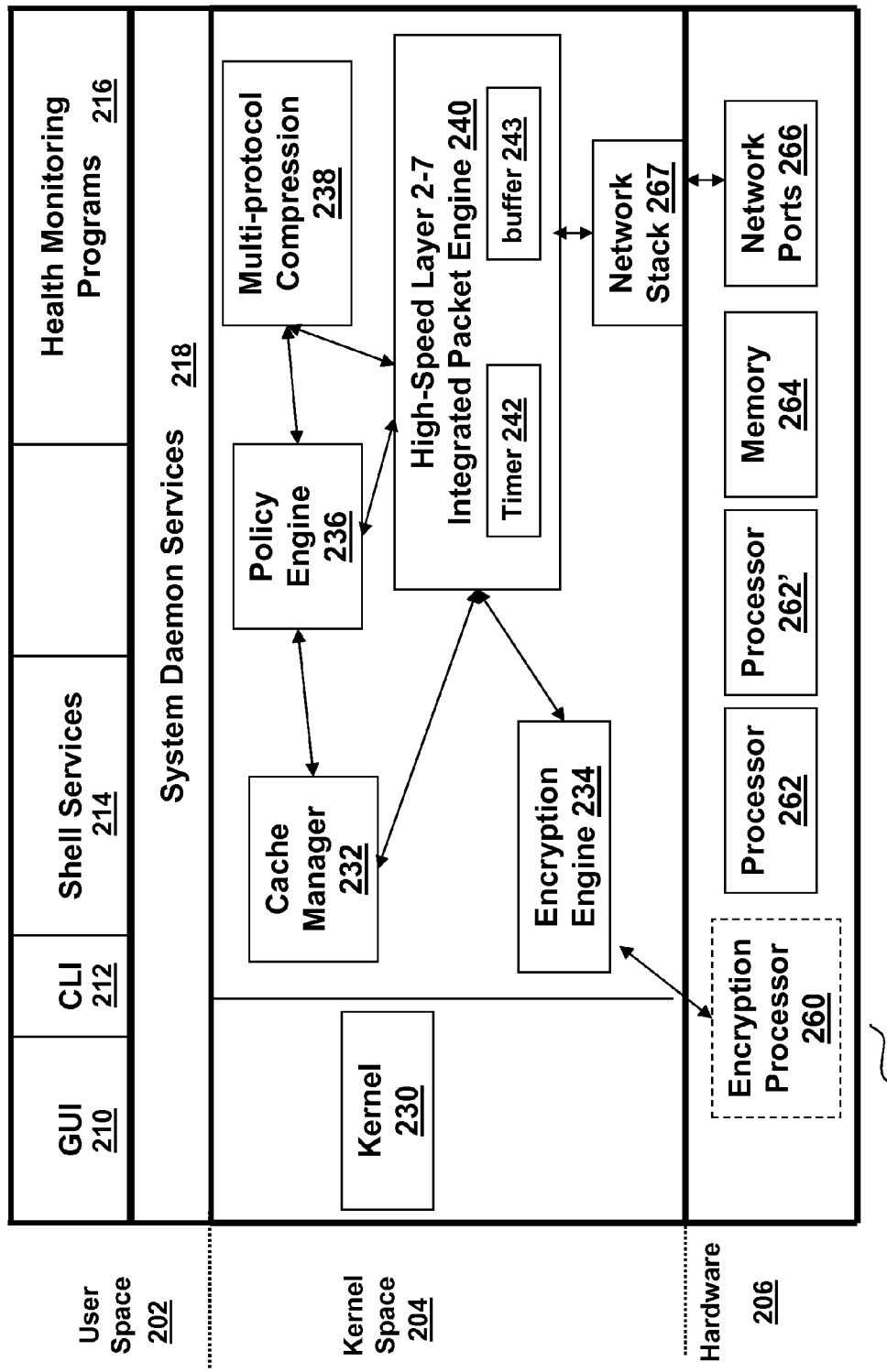
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
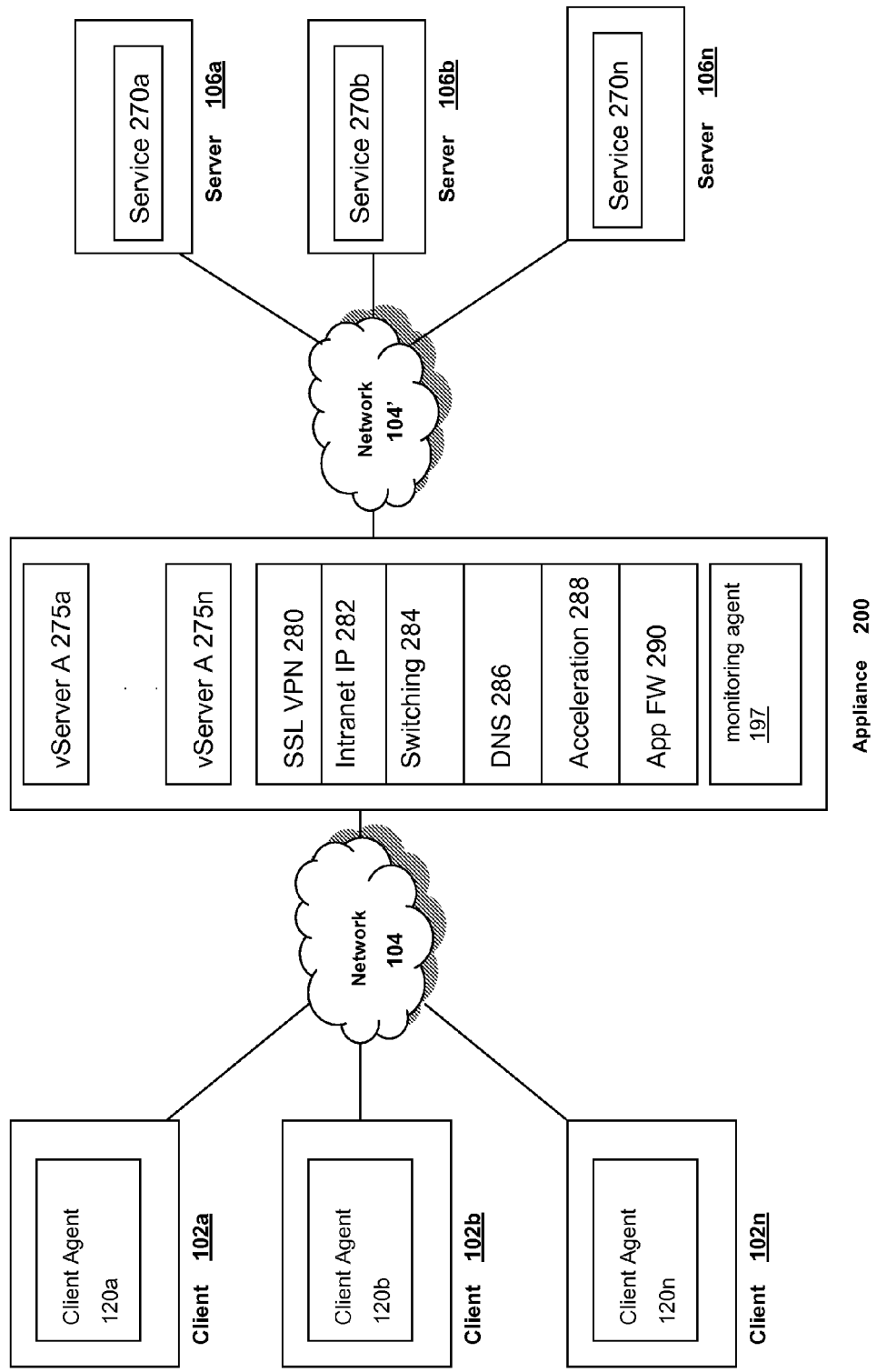
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
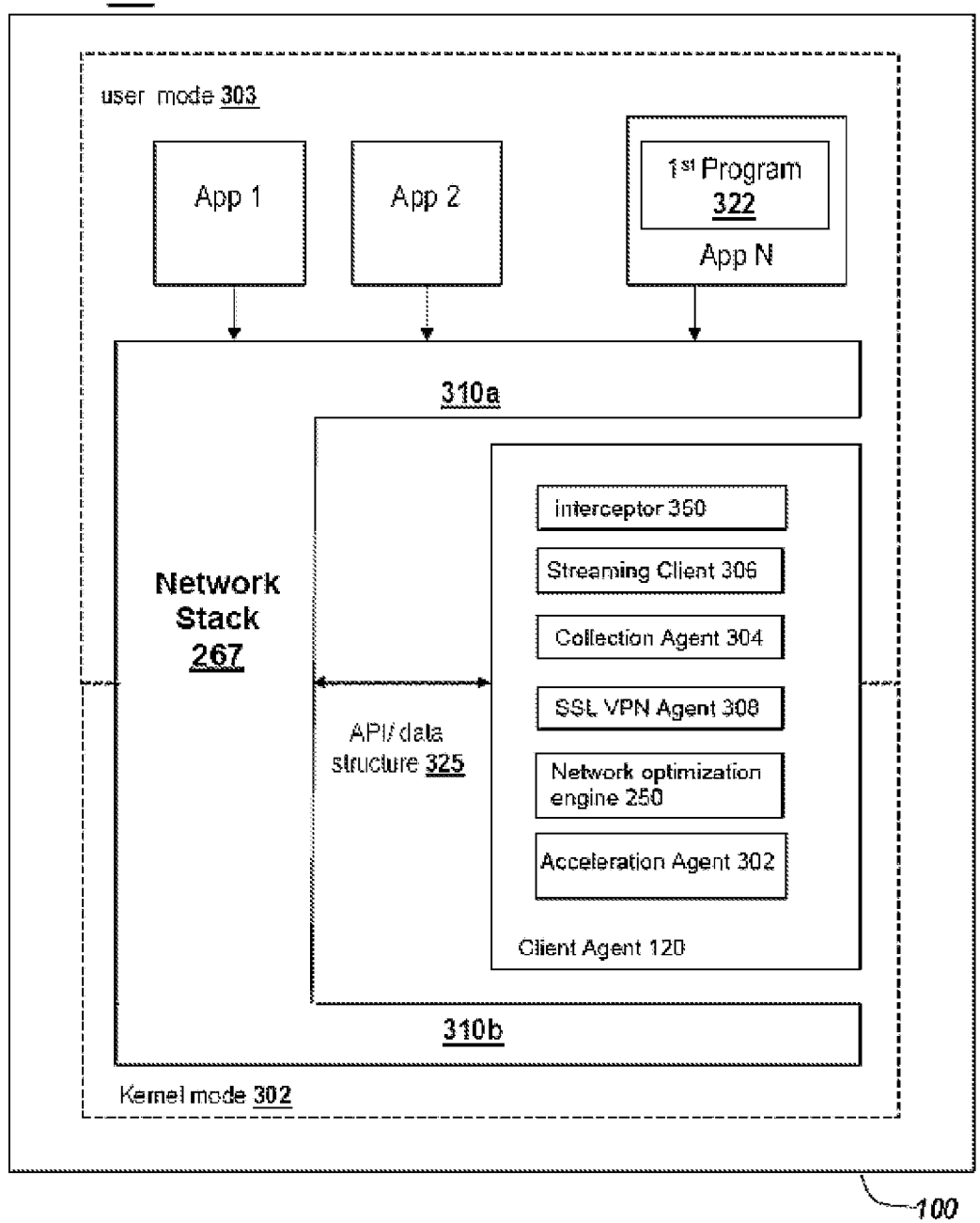
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol. The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archives In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Object Rate Limiting

Figure 4A:
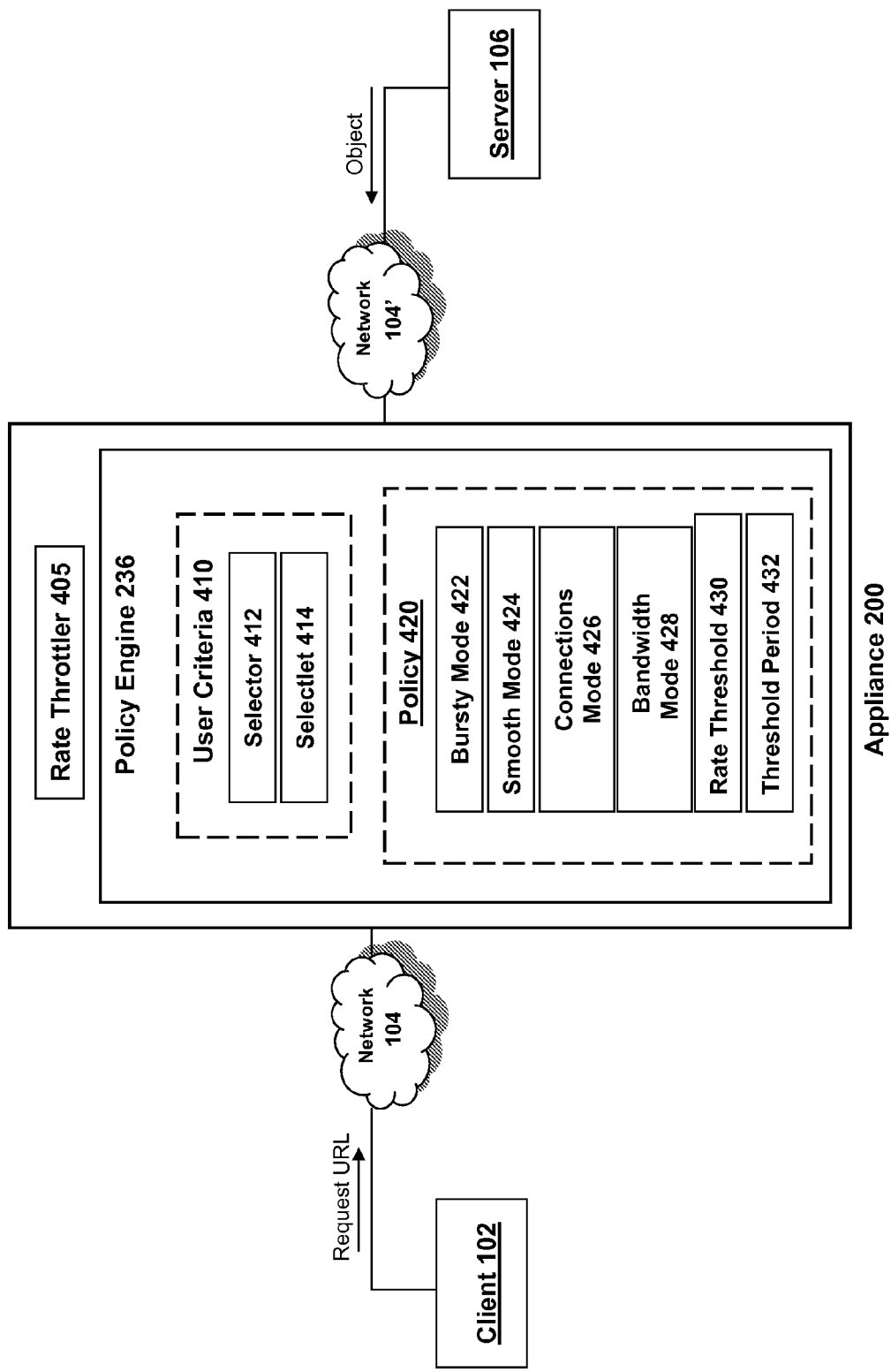
FIG. 4A is a block diagram of embodiments of a system for throttling a rate of requests for objects between a client and a server.

Referring now to FIG. 4A, a block diagram of a system for throttling a rate of requests between a client 102 and server 106 is illustrated. In brief overview, an appliance 200 is an intermediary between a client 102 and a server 106 via networks 104 and 104'. The client transmits a URL request to the server via the appliance 200 and network 104. The URL request may include any information relating to an object 106 or content of the server 106. In response to the request, the server may server an object to the client via the appliance 200. The appliance 200 may include a rate throttler 405 and a policy engine 236. The rate throttler 405 may control or managing a rate of object transmissions between the client 102 and server 106. The policy engine 236 may include one or more policies 420. The policy 420 may be configured with or use the user criteria 410. The user criteria 410 may include user's preferences or selections, such as a selector 412 and a selectlet 414. The selections from the user criteria 410 may be used by the policy engine 236 for creating or modifying policies for controlling a rate of object flow between the client 102 and server 106. Policy 420 may include a number of throttle modes selectable by policy, such as the bursty mode 422, smooth mode 424, connections mode 426 and bandwidth mode 428. Policy 420 further includes a rate threshold 430 and threshold period 432. Rate threshold 430 and threshold period 432 may include values, amounts or metrics which may be used by the policy 440 in determining throttle modes for object rate control by the rate throttler 405.

In further overview of FIG. 4A, the request may comprise any type and form of request for an object or content from a device. The request may include any information relating to any object, feature or service of the server 106. In some embodiments, the request may be a URL request. The request may be a URL identifying a webpage or a file stored on the server 106. In some embodiments, the request is a request to access any type of media content, such as a video or an audio file. For example, the request may be a request to a server to stream a video or an audio file from the server 106. In other embodiments, the request is a request to initiate an application a server 106. In yet other embodiments, the request is a request to establish a session on the server 106. In some embodiments, the request is a request for a transmission of data from one or more servers 106. In many embodiments, the request is not limited to a single server 106, but it rather may be directed to any number of servers 106 or a server farm. In some embodiments, the request is a request to access an application, a file or a resource on the server 106.

The server may server or transmit any type and form of object to the client. The object may comprise any information or data. In some embodiments, the object is a web page. In another embodiment, the object is a URL. In some embodiments, the object is any amount or group of data, such as a bit, byte, or a data packet The object may be a compressed data packet or a predetermined amount of data transmitted from the server 106. In some embodiments, the object is a file, such as a video or an audio file. In some embodiments, the object is an application or a session served by the server 106. The object may be a request, and may include any features or the functionality of a request transmitted from a client 102 or a server 106. In some embodiments, the object is a set of instructions or comments. In some embodiments, the object is a set of instructions, commands, files or data transmitted when initializing or starting up an application, session or connection. In other embodiments, the object is a resource, such as a directory or a database. In some embodiments, the object is an application. In some embodiments, the object is a service provided by the server 106 to be accessed by any client 102 on any server 106.

Rate throttler 405 may comprise software, hardware or any combination of software and hardware to control or manage a rate of transmission or flow of network traffic. The rate throttler may comprise an application, program, library, script, services, process, task, thread or any type and form of executable instructions for controlling or managing a rate of transmission of objects as described herein. Rate throttler 405 may be a component within the policy engine 236 or it may comprise the policy engine 236. In some embodiments, the rate throttler 405 is a component within the appliance 200 working together with the policy engine 236 and communicating and cooperating with any other component of the appliance 200. In some embodiments, rate throttler 405 controls or manages the flow of requests transmitted from the client 102 to the server 106 via the appliance 200. The rate throttler 405 may monitor requests and responses transmitted via the intermediary 200. The rate throttler 405 may monitor objects transmitted via the intermediary 200.

The rate throttler may detect any type and form of object. In some embodiments, the rate throttler detects an object or object type responsive to a policy. The rate throttler may apply different throttling techniques and rates on a per object basis or for each object type. For example, the rate throttler may be responsive to a first policy for a first object type and a second policy for a second object type.

Rate throttler 405 may determine if a request exceeds any threshold, such as the threshold rate 430. Rate throttler 405 may determine if a request received by the appliance 200 exceeds the threshold rate 430 within a given period of time, such as the period of time identified by threshold period 432. In some embodiments, rate throttler 405 determines if a request or an object exceeds a threshold based on a mode of throttling chosen by the policy 420. In some embodiments, rate throttler 405 determine that within a current period of time identified by the threshold period 432 a number of requests for from the client 102 has exceeded the threshold identified by the rate threshold 430. Rate throttler 405 may allow, delay or block requests. In some embodiments, rate throttler 405 may allow, delay or block objects or request for objects transmitted between the client 102 and server 106 via the intermediary 200.

Rate throttler 405 may execute or operate any of the throttling modes of the policy 420. A mode of throttling, herein also referred to as a throttling mode, may be any scheme, technique or algorithm for controlling rate of objects. Throttling modes of the rate throttler 405 may be initiated by the policy 420 and may include any of the modes, such as bursty mode 422, smooth mode 424, connections mode 426 and bandwidth mode 428. Rate throttler 405 may utilize threshold 430 and threshold period 432 to implement, execute and operate any of the throttling modes. In some embodiments, rate throttler 405 comprises functionality to include and combine selections, instructions and preferences of the user into throttling modes of operation. User selections may be used via user criteria 410. Rate throttler 405 may throttler or operate specific requests from a specific client in accordance with instructions from the user, as indicated in the user criteria 410.

Rate throttler 405 may further comprise functionality to throttle requests in accordance with the policy 420 which utilizes user's selections or criteria and modifies the throttling modes used by the rate throttler 405 in accordance with user's selection. Rate throttler 405 may throttle, or control and manage the flow of transmissions between any number of clients 102 and servers 106 using any user selections implemented within any throttling mode. In some embodiments, the rate throttler 405 utilizes any inputs or outputs of any components of the appliance 200 to control and manage throttling of the network traffic between any number of clients 102 and servers 106. Rate throttler 405 may include any functionality for communicating with a policy engine 236 or any subcomponents within the policy engine 236. In some embodiments, rate throttler 405 comprises a network optimization engine, such as a network optimization engine 250. Rate throttler 405 may comprise an acceleration agent, such as the acceleration agent 302. Rate throttler 405 may also comprise any functionality of any component or subcomponent of the appliance 200, client 102 or server 106 stated herein.

Policy engine 236 includes any embodiments of the policy engine 236 and/or policy engine 195 previously described herein (see FIG. 2A). Policy engine 236 may further include any functionality to select, initiate, control, modify or implement any rules or policies regulating selection of the throttling modes. In some embodiments, policy engine 236 includes rules and policies governing selection of throttling modes given the inputs or selections of the user, such as user criteria 410, for example. Policy engine 236 may include any functionality to produce policies which govern, manage, modify or change the throttling modes or the operation of the throttling modes. For example, the policy engine 236 may receive from the user an instruction to redefine the rate threshold 430 or a threshold period 432 of an operating throttling mode, and in response utilize an appropriate functionality within the policy engine 236 to modify the throttling mode in accordance with user's instruction. Policy engine 236 may further include functionality to produce new throttling modes governing the rate throttler 405.

In one embodiment, the policy engine 236 provides a configuration mechanism or functionality to enable hashing of the transmissions such as requests or objects into subcomponents. For example, the policy engine 236 may utilize any functionality to hash a request received by the appliance 200 and identify a component of the request matching an object identified by the user in a user criteria 410. The policy engine 236 may comprise functionality to create a policy 420 which changes or modifies a throttling mode used by the rate throttler 405 in throttling of the requests traversing the appliance 200. In some embodiments, policy engine 236 comprises functionality that e modification, control and selection of throttling modes used for throttling of the requests or objects traversing the appliance 200. Policy engine 236 may include functionality, circuitry, hardware and software necessary to utilize user's selections to switch between different throttling modes used by the rate throttler 405. Policy engine 236 may further include any number of additional throttling modes, and any number of policies for choosing throttling modes. Policy engine 236 may include functionality for creating new throttling modes using user's preferences and user's selections. In addition, the policy engine 236 may include any configuration for governing selection, management, control or switching of the throttling modes used by the rate throttler 405.

User criteria 410 may be a user selection, user input or user preference and may be utilized for choosing the operation of the rate throttler 405. User criteria 410 may also store or manage any number of user inputs, selections, or inputs, such as values, characters, variables, inputs, data structures, user instructions, commands, arrays, or selections related to the operation of the rate throttler 405. User criteria 410 may include user selects or inputs for governing the selection of throttling modes used by the rate throttler 405. User criteria 410 may include any type and form of inputs, such as values, data structures, arrays, characters or groups of characters, user specified types or variables for any throttling mode. User criteria 410 may further include any user inputs to be used when creating policies that choose, initiate, activate, deactivate, switch or modify any policies such as the policy 420 or any throttling mode, such as bursty mode 422, smooth mode 424, connections mode 426 or bandwidth mode 428.

User criteria 410 may be used by the policy 420 to create, modify or edit policies governing selection of throttling modes. In some embodiments, user criteria 410 includes values or selections relating any user input used for selecting the throttling mode for the rate throttler 405. User criteria 410 may include a rate threshold 430 input for identifying a threshold for the number of requests transmitted or a threshold period 432 input for identifying a time period within which the number of requests should not exceed the rate threshold 430. In some embodiments, user criteria 410 comprises user selections selected by the user to identify specific requests or objects for which to create a policy 420. The user criteria 410 may further specify specific policies to be implemented when such user identified objects or requests are encountered by the appliance 200. For example, a user criteria may include an identification of a specific request for an object, which when encountered may trigger a change in the throttling mode used by the rate throttler 405. In some embodiments, user criteria 410 includes values and selections corresponding to the preference of selection of the throttling modes to be used by the rate throttler 405. In some embodiments, user criteria 410 includes values and selections corresponding to the selection of specific policies to be used by the policy engine 236 to choose the throttling modes.

For example, a user criteria 410 may specify a series of policies to be implemented when a specific object is requested or a specific object is transmitted. User criteria 410 may also include a timing, an instruction or a limitation for selecting a throttling mode, as well as instructions when a specific throttling mode should be turned off or replaced by another throttling mode. In some embodiments, user criteria 410 includes threshold values corresponding to the rate threshold 430 for number of requests or objects. In some embodiments, user criteria 410 includes user selected values corresponding to threshold period 432 for the number of requests or objects traversed without interruption within a time interval determined by the threshold period 432. In other embodiments, user criteria 410 includes user selected values corresponding to rate threshold 430 for the number of requests or objects blocked or delayed before the number of requests or objects reaches the threshold period 432. In some embodiments, user criteria 410 includes user selected values corresponding to threshold period 432 for the period of time within which the number of requests or objects are blocked or delayed before the number of requests or objects reaches the threshold period 432.

Selector 412 may be any unit, component or data structure that includes a number of user selections used by the policy engine 236. In some embodiments, selector 412 includes components comprising user information used for creating a policy 420 for selecting a throttling mode. Selector 412 may include a data structure storing any number of identifiers, inputs or representations of different network entities selected by a user. Selector 412 may be used by the policy 420 for creating a policy for selecting, modifying or combining of the throttling modes. Selector 412 may also be used for identifying an object or a request to trigger a policy for selecting a throttling mode of operation of the rate throttler 405. In some embodiments, selector 412 may include a user input or a user's selection to reset or modify the value of the rate threshold 430. In other embodiments, selector 412 may include a user input or a user's selection to reset or modify the value of the threshold period 432. In some embodiments, selector 412 includes a representation of a set of values or characters identifying an entity on a network, such as a client 102, server 106 or an appliance 200. Selector 412 may include a plurality of user selections or user inputs to be used for creating or changing the operation of any throttling mode. Selector 412 may be any data structure or an array comprising any number of values, characters or identifiers of a client 102 or server 106. Selector 412 may include any number of user names or a client names, or internet protocol addresses, host names or domain names of clients 102 or servers 106. In some embodiments, selector 412 includes an identifier, a user name or an internet protocol address of an appliance 200. Selector 412 may include a string, value or a variable referring to a specific policy or throttling mode within the policy 420. In some embodiments, selector 412 includes a user's selection of a throttling mode to be used for a specific request or a specific object. Selector 412 may include a user selection for a throttling mode to be used for throttling of a specific user identified request or object transmitted to or from a specific client 102 or server 106. Selector 412 may further include a threshold value or a string of threshold values to be used as rate threshold 430 for a specific throttling mode. In some embodiments, selector 412 includes a threshold value or a string of threshold values to be used as rate threshold 430 for a specific throttling mode. In some embodiments, selector 412 includes a value indicating a period of time or a plurality of values indicating a plurality of periods of time to be used as threshold period 432 for a specific throttling mode. In other embodiments, selector 412 includes a value indicating a period of time or a plurality of values indicating a plurality of periods of time to be used as threshold period 432 for a specific throttling mode. Selector 412 may comprise any number of selectlets 414, each of which may identify a specific value, character, instruction, selection or a user input to be used by the policy 420. In some embodiments, selector 412 comprises a number of data types which are hashed into components and stored in a number of selectlets 414 within the selector 412.

Selectlet 414 may be any value, identifier, character, user input, selection or a string stored inside of a selector 412. In some embodiments, selectlet 414 is a string of characters of values within the selector 412. In further embodiments, selectlet 414 is a hash of a string stored in an allocated space of the selector 412. Selectet 414 may be a string of any length. Selector 412 may include any number of selectlets 414, each selectlet 414 having any length of characters or values. In some embodiments, selectlet 412 refers to a specific data point policy or a rule selected by a user to be associated with a user identified selector 412. Selectlet 414 may include any specific selection of the user used for creating a policy for choosing or picking a throttling mode for the rate throttler 405. Selectlet 414 may include an identifier of an entity on a network, such as an internet protocol address. In some embodiments, selectlet 414 includes a threshold value for the rate threshold 430 chosen by the user. In some embodiments, selectlet 414 includes a value for a period of time for a threshold period 432. Sometimes, selectlet 414 may include an array of rate threshold 430 values or an array of threshold period 432 values. In some embodiments, selectlet 414 includes a domain name of a service or resource on a network device. In other embodiments, selectlet 414 includes a unique resource locator (URL) of a webpage or website. In further embodiments, selectlet 414 includes an internet protocol address of a network device. In further embodiments, selectlet 414 includes a port identifier uniquely identifying a port on a network device. In further embodiments, selectlet 414 includes a cookie value of a transmission, such as a request or a response. In still further embodiments, selectlet 414 includes a directory name or a file name. In yet further embodiments, selectlet 414 includes a link or a portion of a link. In still further embodiments, selectlet 414 includes a command or an instruction from a user. In yet further embodiments, selectlet 414 includes a user specified selection criteria. Selectlet 414 may be any individual or a group of selections, characters, variables, user inputs, user selections, commands or instructions stored within any selector 412 or stored individually.

Policy 420 may be any unit, structure, function, configuration or component that controls and manages the selection or modification of throttling modes used by the rate throttler 405 to control the flow of requests or objects traversing the appliance 200. Policy 420 may include any number of policies, rules, functions, configurations or operations to enable controlling or managing of the throttling modes. Policy 420 may be configured, designed or constructed to control, manage or monitor a rate of transmissions of requests or objects traversing the appliance 200. Policy 420 may comprise any rules, logic or functions enabling combining of any number of throttling modes with user criteria 410 in modifying the operation of the rate throttler 405. Policy 420 may engage, disengage, initiate change or modify any throttling mode in accordance with user criteria 410. Policy 420 may comprise instructions, configurations or any functionality for choosing or modifying the throttling modes, such as the bursty mode 422, smooth mode 424, connections mode 426 and bandwidth mode 428. Policy 420 may in addition further comprise any rules or configurations to control, initiate or modify the methods of choosing or selecting any of the throttling modes. In some embodiments, policy 420 includes rules for changing or modifying the rate threshold 430 and threshold period 432 when a user identified object is identified within a request received by the appliance 200. Policy 420 may include any functionality to modify the throttling modes in order for the throttling modes to monitor, block, allow, delay or phase over a period of time any requests or objects being transmitted between a client 102 and server 106 via the appliance 200.

Rate threshold 430 may be any value, signal, variable or a function identifying an amount of objects or requests for objects permitted to traverse via the appliance 200 within a predetermined amount of time. In some embodiments, rate threshold 430 is any threshold value for the number of requests below which requests or objects received by the appliance 200 are not to be interrupted. In other embodiments, rate threshold 430 is any value, user input, signal from a network entity or a function identifying a threshold value for the number of requests above which requests or objects received by the appliance 200 are not to be interrupted. When the requests or objects are determined as not to be interrupted, the appliance 200 may simply forward the requests or objects to their intended destinations. In some embodiments, rate threshold 430 is a number of requests allowed to traverse the appliance 200 within a predetermined time period, such as threshold period 430. In some embodiments, rate threshold 430 is a value or a number. In some embodiments, rate threshold 430 is an array of number or values. Rate threshold 430 may identify a threshold of allowable transmissions of requests or objects over any time interval. Rate threshold 430 may identify a threshold for allowable rate of transmission in terms of a number of kilobytes per second, megabytes per second, objects per second or requests of objects per second to be transmitted within any time interval. In some embodiments, rate threshold 430 may identify a threshold value for an amount of objects, requests, data packets, megabytes, gigabytes, applications, sessions, webpages, or specific amounts of data to be transmitted between the client 102 and server 106 over a predetermined period of time.

Threshold period 432 may be any duration of time or any time interval. Threshold period 432 may be any period of time, time duration or time interval within which an amount of requests not exceeding the rate threshold 430 is allowed to be transmitted by the rate throttler 405 without interruptions. In some embodiments, threshold period 432 is any period of time, time duration or time interval within which an amount of requests exceeding the rate threshold 430 is allowed to be transmitted by the rate throttler 405 without interruptions. In some embodiments, threshold period 432 is a predetermined amount of time, such as a millisecond, second, minute, hour, month or a year. In some embodiments, threshold period 432 is any period of time within which a specific amount of requests or objects is allowed to traverse the appliance 200.

Rate throttler 405 may block the transmission of a request received by the appliance 200 from reaching the intended destination if the request exceeds the rate threshold 430 within the time period specified by the threshold period 432. Threshold period 432 may be a set amount of time or a varying amount of time. Threshold period 432 may be modified by the policy 420 or the policy engine 236 upon the request of the user via user criteria 410. Threshold period 432 may be a period of time set upon encountering a specific request for object, instruction or a command from a client 102. In some embodiments, threshold period 432 is a time period set by the policy 420 or the throttling mode for regulating the flow of requests or objects between the client 102 and server 106 and traversing appliance 200.

Bursty mode 422 may be any throttling mode of operation of the rate throttler 405 which allows the client to exhaust a quota for transmission per a selected time period at any time within the time period. In some embodiments, bursty mode 422 is a throttling mode allowing the client 102 to transmit any request to the server 106 via the appliance 200 over a predetermined period of time provided that the number of requests within the predetermined period of time does not equal to, or exceed the predetermined threshold. For example when operating in bursty mode 422, the rate throttler 405 allows transmission of any number of requests or objects via the intermediary 200 over a period of time defined by the threshold period 432, until the number of the requests or objects transmitted becomes equal to or exceeding the value defined by the rate threshold 430. In some embodiments, bursty mode 422 may be changed or modified according to the user criteria 410 that identifies a new value of the rate threshold 430 to replace the previous value of the rate threshold 430. Similarly, the bursty mode 422 may be changed or modified according to the user criteria 410 that identifies a new value indicating the period of time of the threshold period 432 to replace the previous value of the period of time of the threshold period 432. Updated values of the bursty mode 422 may be used by the rate throttler 405 while throttling of the requests and objects, thus affecting the flow of the objects and requests transmitted.

Smooth mode 424 may be any throttling mode of operation of the rate throttler 405 which allows the client to exhaust client's quota for transmission at a pace spread out over the entire selected time period. Smooth mode 424 may utilize a rate threshold 430 identifying a rate of transmission at any given moment within the threshold period 432 in order to throttle the rate of objects traversing the appliance 200. For example, the smooth mode 424 may utilize a rate threshold 430 identifying a predetermined amount of objects per second over a threshold period 432. The smooth mode 424 will in this case allow the client to receive objects at a maximum rate of less than or equal to the predetermined amount of objects per second over the entire threshold period 432. However, the smooth mode 424 would regulate the transmission of the objects to the client never to exceed the amount of objects per second allowed and never to block transmissions to the client. The objects would not have to be blocked en route to the client since the amount of objects per second even if transmitted for the entirety of the threshold period 432 would not exceed the client's quota.

Connections mode 426 may be any throttling mode of operation of the rate throttler 405 limiting a number of active transactions of the client. In some embodiments, connections mode 426 limits the number of connections between the client 102 and server 106 by using the rate threshold 430 as the maximum number of allowable connections between the client 102 and server 106 over the threshold period 432. In some embodiments, the rate threshold 430 is the threshold of the number of sessions the client 102 may establish with the server 106 via the appliance 200. If the number of client requests to establish a session with the server 106 exceeds the value of the rate threshold 430 within the threshold period 432, the rate throttler 405 blocks the request for the session. In some embodiments, when the number of client requests to establish a session with the server 106 exceeds the rate threshold 430 within the threshold period 432, the rate throttler 405 blocks session from being established between the client 102 and server 106.

Bandwidth mode 428 comprises a throttling mode based on bandwidth usage to determine the client's quota or client's transmission rate. In some embodiments, bandwidth mode 428 utilizes a bandwidth monitor to determine the bandwidth used by the session between the client 102 and server 106 to determine the rate threshold 430. The rate threshold 430 may be set in terms of megabytes per second or objects per second. In some embodiments, the bandwidth mode 428 allow the policy 420 to adjust the value of the rate threshold 430 after determining by the appliance 200 that the available bandwidth of the network has changed. In bandwidth mode 428, the policy 420 may adjust or update the rate threshold 430 to more accurately determine the client's transmission rate by setting a new rate threshold 430. In some embodiments, the policy 420 may adjust or update the threshold period 432 to more accurately determine the client's transmission rate by setting a new threshold period 432. For example, in order to increase the client's transmission rate one can either increase the rate threshold 430 leaving the threshold period 432 unchanged, or decrease threshold period 432 and leave the rate threshold 430 unchanged. Bandwidth mode 428 may thus manage the client's quota by setting the rate threshold 430 according the bandwidth available to the client 102 and server 106 or according to the bandwidth used by the client 102 and server 106. Bandwidth mode 428 may also manage client's transmission rate by managing or modifying the rate threshold 430 per threshold period 432 ratio. In some embodiments, bandwidth mode 428 may manage client's transmission rate by setting the rate threshold 430 to a value corresponding to the rate of transmission, such as objects per second, rather than the number of transmission, such as objects for example.

In an example of operation, a selector 412 from a user may include a selectlet 415 identifying a timing interval within which bursty mode 422 should replace any other throttling mode used by the rate throttler 405. The selector 415 may also include another selectlet 415 identifying a specific object of the server 106. The policy engine creates a policy which is configured to activate the bursty throttling mode at the user specified time. The policy engine 236 also creates another policy which recognizes the user specified object or a request for the user specified object and chooses a connections mode 426 once the user specified object or the request of the user specified object is encountered. At the user specified time the policy 420 activates bursty mode 422 and the rate throttler 405 starts operating according to the bursty mode 422. Upon detecting the request for the user specified object, the policy 420 deactivates bursty mode 422 and activates connections mode 426 for the rate throttler 405. Rate throttler 405 then throttles the user specified object according to the connections mode 426. The rate threshold 430 and threshold period 432 may also change with the change of the throttling modes allowing the rate throttler 405 to keep track of events at both modes if necessary.

In some examples, an appliance 200 may be configured to run at a specific mode using a series of instructions and commands. Such commands may identify a selector 412 named "selector" using commands "add ns limit-". In the following embodiment, selector 412 comprising selectlets 414 named "REQ.URL.HOSTNAME" and "REQ.METHOD" is formed using an instruction, such as:

add ns limit-selector lmt_post_req_selector REQ.URL.HOSTNAME REQ.METHOD

In another embodiment, rate threshold 430, threshold period 432 and the bursty throttling mode are also defined using similar instructions. In this embodiment, threshold 432 is referred to as "ratethreshold", threshold period 432 is referred to as "timeslice" and the operating mode is set to burst using "mode burst". An instruction used for this purpose may look like:

```
add ns limit-identifier lmt_post_req -ratethreshold 100 -timeslice
100 -mode burst -timeout 2 -selector lmt_post_req_selector
```

In another embodiment, selector 412 is further modified to include selectlets 414 named "CLIENT.UDP.DNS.DOMAIN" and "CLIENT.IP.SRC". The code used to define such an embodiment may be:

add ns limitSelector sel_cs CLIENT.UDP.DNS.DOMAIN CLIENT.IP.SRC

In still another embodiment, threshold period 432 is set to 20000 and the operating mode is set to bandwidth mode, using an instruction such as:

```
add ns limitIdentifier k_cs -timeSlice 20000 -mode
RATE_BANDWIDTH -selectorName
sel_cs -maxBandwidth 1 -trap ENABLED -trapsInTimeSlice 20
```

In yet another embodiment, appliance 200 may be configured to limit a number of http requests to a URL to a maximum of hundred requests per second. The configuration may be setup to operate irrespective of which client sends the request. Such a configuration may be accomplished without utilization of any selectors 412 or selectlets 414. An instruction to implement this configuration may look like:

```
add ns limitIdentifier k_no_sel -rateThreshold 2 -timeSlice 4000 -trap
ENABLED -trapsInTimeSlice 30.
add responder policy reponder_pol_devTest
"HTTP.REQ.URL.CONTAINS(\"Xbox.html\") &&
SYS.CHECK_LIMIT(\"k_no_sel\")"
send_redirect_url
```

In another embodiment, a policy may be specified to limit the rate of access to the url based on the user's cookie value and internet protocol address. Such policy may be configured using instructions, such as:

```
add ns limitSelector sel_req_cookie
"HTTP.REQ.COOKIE.VALUE(\"DISKCOOKIE\")"
"CLIENT.IP.SRC.SUBNET(24)"
add ns limitIdentifier k_req_cookie -rateThreshold 2 -timeSlice
3000 -selectorName sel_req_cookie
add responder policy reponder_pol_devTest
"HTTP.REQ.URL.CONTAINS(\"Xbox.html\") &&
SYS.CHECK_LIMIT(\"k_req_cookie\")" send_redirect_url
add ns limitSelector sel_cs CLIENT.UDP.DNS.DOMAIN
CLIENT.IP.SRC
add ns limitIdentifier k_cs -timeSlice 20000 -mode
```

-continued

```
RATE_BANDWIDTH -selectorName
sel_cs -maxBandwidth 1 -trap ENABLED -trapsInTimeSlice 20
add dns policy dns_pol
"SYS.CHECK_LIMIT(\"k_cs\")" -drop YES
```

Referring now to FIG. 4B, a flow diagram of an embodiment of a method for throttling a rate of requests between a client and a server is illustrated. In brief overview of method 400, at step 405, an intermediary receives a request from a client for an object of a server. At step 410, the intermediary identifies the object based on one or more user specified selection criteria. At step 415, a policy engine of the intermediary identifies for the request a policy specifying a mode of throttling, a rate threshold and a period of time for the rate threshold. At step 420, a rate throttler determines whether the request exceeds the rate threshold for the period of time based on the mode of throttling of the policy. At step 425, the rate throttler allows or blocks the request responsive to the determination.

In further overview, at step 405 an intermediary receives a request that includes an information relating an object of a server from any device on a network 104. In some embodiments, the intermediary 200 receives a request including an information related to a plurality of objects from one or more servers 106. The request may be any request to access or use any service provided by any server 106 on the network. The request may include any information uniquely identifying the object, such as an object identifier uniquely identifying the object and an internet protocol address uniquely identifying the server 106 the object is located on. In some embodiments, an intermediary 200 receives from the client 102 a request requesting an object from the server 106 via the appliance 200. The object requested or included in the request's information may be any service provided by the server, such as a client-user session, a connection between the client and the server, an application provided by the server, a file on the server or a data the client desires to retrieve from the server. In some embodiments, the object referred to by the request is previously identified by the user, via a selector 412 or a selectlet 414. In other embodiments, the object is selected by one or more user specified selection criteria, such as the user criteria 410. The request may be a request for a specific object, or a request comprising an information relating or identifying an object.

At step 410, the intermediary identifies the object based on any number of user criteria or user selections. The intermediary may identify the object in response to the information relating the object from the request received by the intermediary 200. In some embodiments, the intermediary 200 receives the request and recognizes an object within the information of the request. The object may be identified via the name of the object within the information from the request. In some embodiments, the information may include a unique identifier, uniquely identifying the object. In further embodiments, the information may include a unique identifier of the specific server 106 serving or providing the object. The intermediary may identify the object by hashing the request and matching the hashed components against the user criteria 410. In some embodiments, the intermediary identifies the object by hashing the request received by the appliance 200 and matching the hashed components against the selectors 412 or selectlets 414. The intermediary may identify the object by matching a portion of the request with a user input or a user selection from a component within the user criteria 410.

At step 415, a policy engine of the intermediary identifies for the request one or more policies that specify any number of modes of throttling, thresholds such as rate thresholds and periods of time for the thresholds such as the threshold periods. In some embodiments, the policy engine 236 identifies a policy 420 that specifies or initiates a throttling mode for throttling a predetermined type of object. The policy engine 236 may further specify a rate threshold 430 for the throttling mode. In addition, the policy engine 236 may specify a threshold period 432 for the specified mode of throttling. The throttling mode initiated by the policy 420 may be identified by policy engine 236 in response to the request or in response to a portion of the request. In some embodiments, the throttling mode initiated by the policy 420 may be identified by policy engine 236 in response to an information associated with the request. The policy engine 236 may identify the policy 420 specifying a throttling mode based on a portion of the request identifying an object of the server 106. In other embodiments, the throttling mode initiated by the policy 420 may be identified by policy engine 236 in response to the appliance 200 identifying the client, or the user on the client. In some embodiments, the throttling mode initiated by the policy 420 may be identified by policy engine 236 in response to detection by the appliance 200 that the traffic traversing the appliance 200 is above the threshold of the traffic that sustained by the appliance 200.

In some embodiments, the policy engine 236 identifies a policy 420 that specifies or initiates a throttling mode for throttling a plurality of requests identified by the request. The policy engine 236 may also identify a policy 420 that initiates and utilizes a plurality of throttling modes for throttling any number of requests. The policy 420 may further specify additional instructions or parameters for initiating, engaging, disengaging, operating or combining the operation of the plurality of throttling modes to be used by the rate throttler 405. In some embodiments, the policy 420 specifies a bursty mode 422 as the mode of throttling. In some embodiments, the policy 420 specifies the smooth mode 424 as the mode of throttling. In many embodiments, the policy 420 specifies the connections mode 426 as the mode of throttling. In a number of embodiments, the policy 420 specifies the bandwidth mode as the mode of throttling. In many embodiments, the policy 420 specifies a combination of two or more modes of throttling. The modes of throttling may be combined such that one throttling mode is used for some requests from the client, while other mode of throttling is used for other requests from the client. In some embodiments, the combination of throttling modes is controlled by the policy 420 which uses a first throttling mode for throttling a first portion of a request and a second throttling mode for throttling the second portion of the request.

At step 420, a rate throttler determines if the request exceeds a threshold such as the rate threshold 430 for the period of time, such as the threshold period 432 in accordance with any of the modes of throttling of the policy 420. The rate throttler 405 may monitor and count the requests from the client 102 to the server 106. The rate throttler 405 may further compare the count of the number of requests against the rate threshold 430. In some embodiments, the rate throttler 405 compares the number of requests received from the client 102 against the rate threshold 432 within the time interval defined by the threshold period 432. In some embodiments, rate throttler 405 receives the determination that the request exceeds a threshold from another component of the appliance 200. In further embodiments, the rate throttler 405 determines if the request exceeds a threshold value based on a policy 420. In many embodiments, the rate throttler 405 determines if the request exceeds a threshold by counting a number of requests received within a time period identified by the threshold period 432. The rate throttler may compare the request count received within the time period such as the threshold period 432 against the threshold, such as the rate threshold 430.

At step 425, the rate throttler allows, blocks or delays the request responsive to the determination of step 420 In some embodiments, the rate throttler 405 allows the request to traverse the appliance 200. In other embodiments, the rate throttler 405 blocks the request from traversing the appliance 200. In further embodiments, the rate throttler 405 delays the request for a period of time before transmitting the request to the destination, such as the server 106. In some embodiments, the rate throttler 405 traverses the request, blocks the request or delays the request in response to determination that the request exceeds the rate threshold 430 within the threshold period 432. In many embodiments, the rate throttler 405 delays the request responsive to the rate threshold 430 and threshold period 432. In some embodiments, if the request from the client 102 is less then the rate threshold 430, but the request count is close to the rate threshold 430, the rate throttler 405 may delay transmission of the request in accordance with the difference of rate threshold 430 and the client request count. In some embodiments, if the request from the client 102 is less than the rate threshold 430, but the request count is close to the rate threshold 430, the rate throttler 405 may delay the transmission in accordance with the difference of the threshold period 432 and the amount of time remaining within the threshold period 432 at the time of receipt of the request.

What is claimed is:

1. A method for throttling by an intermediary a rate of requests for an object, the intermediary receiving requests between a client and a server, the method comprising:
   a) receiving, by an intermediary; a request from a client for an object of a server, the request identifying the object;
   b) identifying, by the intermediary, a policy for an object type corresponding to the object identified by the request, the policy specifying a mode of throttling of a plurality of modes of throttling, a rate threshold and a period of time for the rate threshold;
   c) determining, by a rate throttler of the intermediary, whether the request for the object exceeds the rate threshold for the period of time based on the mode of throttling of the policy for that object type; and
   d) one of allowing or blocking, by the rate throttler, the request for the object responsive to the determination.

2. The method of claim 1, wherein step (a) further comprising identifying the object based on one or more user specified selection criteria.

3. The method of claim 2, wherein step (b) further comprises identifying the policy based on the identified object.

4. The method of claim 1, wherein step (b) further comprising specifying, by the policy, the mode of throttling as bursty.

5. The method of claim 1, wherein step (b) further comprising specifying, by the policy, the mode of throttling as smooth.

6. The method of claim 1, wherein step (b) further comprising specifying, by the policy, the mode of throttling based on a number of connections from the client.

7. The method of claim 1, wherein step (b) further comprising specifying, by the policy, the mode of throttling based on bandwidth used by the client via the intermediary.

8. The method of claim 1, wherein step (c) further comprises determining, by the rate throttler, that during a current time period specified by the period of time of the policy a number of requests for the object has exceeded the rate threshold.

9. The method of claim 8, wherein step (d) further comprises blocking, by the rate throttler, the request upon receipt of the request.

10. The method of claim 1, wherein step (c) further comprises determining, by the rate throttler, that during a current time period specified by the period of time of the policy a number of requests for the object is less than or equal to the rate threshold.

11. The method of claim 10, wherein step (d) further comprises allowing, by the rate throttler, the request and forwarding the request to the server.

12. A system for throttling by an intermediary a rate of requests for an object, the system comprising:
   an intermediary receiving a request from a client for an object of a server, the request identifying the object;
   a policy engine identifying a policy for an object type corresponding to the object identified by the request, the policy specifying a mode of throttling, a rate threshold of a plurality of modes of throttling and a period of time for the rate threshold;
   a rate throttler determining whether the request exceeds the rate threshold for the
   period of time based on the mode of throttling of the policy for that object type; and wherein the rate throttler allows or blocks the request for the object responsive to the determination.

13. The system of claim 12, wherein the policy engine identifies the object based on one or more user specified selection criteria.

14. The system of claim 13, wherein the policy engine identifies the policy based on the identified object.

15. The system of claim 12, wherein the policy specifies the mode of throttling as bursty.

16. The system of claim 12, wherein the policy specifies the mode of throttling as smooth.

17. The system of claim 12, wherein the policy specifies the mode of throttling based on a number of connections from the client.

18. The system of claim 12 wherein the policy specifies the mode of throttling based on bandwidth used by the client via the intermediary.

19. The system of claim 12, wherein the rate throttler determines that during a current time period specified by the period of time of the policy a number of requests for the object has exceeded the rate threshold.

20. The system of claim 19, wherein the rate throttler blocks the request upon receipt of the request.

21. The system of claim 12, wherein the rate throttler determines that during a current time period specified by the period of time of the policy a number of requests for the object is less than or equal to the rate threshold.

22. The system of claim 21, wherein the rate throttler allows the request and forwards the request to the server.

* * * * *